United States Patent
Rodenhiser et al.

(10) Patent No.: US 12,551,852 B2
(45) Date of Patent: Feb. 17, 2026

(54) SECONDARY STATISTICAL CUTOFF METHODOLOGY FOR GAS-LIQUID DIFFUSION INTEGRITY TESTING

(71) Applicant: EMD Millipore Corporation, Burlington, MA (US)

(72) Inventors: Rebecca Rodenhiser, Jaffrey, NH (US); Salvatore Giglia, Bedford, MA (US); Christopher Johnson, Bedford, NH (US)

(73) Assignee: EMD Millipore Corporation, Burlington, MA (US)

( * ) Notice: Subject to any disclaimer, the term of this patent is extended or adjusted under 35 U.S.C. 154(b) by 260 days.

(21) Appl. No.: 18/254,970

(22) PCT Filed: Dec. 16, 2021

(86) PCT No.: PCT/US2021/063763
§ 371 (c)(1),
(2) Date: May 30, 2023

(87) PCT Pub. No.: WO2022/146704
PCT Pub. Date: Jul. 7, 2022

(65) Prior Publication Data
US 2024/0001306 A1    Jan. 4, 2024

Related U.S. Application Data

(60) Provisional application No. 63/131,850, filed on Dec. 30, 2020.

(51) Int. Cl.
*B01D 65/10* (2006.01)
*G01N 15/08* (2006.01)

(52) U.S. Cl.
CPC ....... *B01D 65/102* (2013.01); *G01N 15/0826* (2013.01); *G01N 2015/084* (2013.01)

(58) Field of Classification Search
CPC ...... B01D 65/00; B01D 65/10; B01D 65/102; G01N 15/00; G01N 15/08; G01N 15/0826; G01N 2015/084
See application file for complete search history.

(56) References Cited

U.S. PATENT DOCUMENTS

| | | | |
|---|---|---|---|
| 4,614,109 A | * | 9/1986 | Hofmann ............ B01D 65/102 73/38 |
| 5,282,380 A | | 2/1994 | Dileo et al. |

(Continued)

FOREIGN PATENT DOCUMENTS

| | | | | |
|---|---|---|---|---|
| AU | 2525999 A | * | 9/1999 | .......... B01D 65/104 |
| CN | 109890485 A | | 6/2019 | |

(Continued)

OTHER PUBLICATIONS

Office Action received for Japanese Patent Application No. 2023-540013 mailing date May 7, 2024, 10 Pages (5 Pages of English translation & 5 Pages of Official copy).

(Continued)

*Primary Examiner* — Nguyen Q. Ha
(74) *Attorney, Agent, or Firm* — EMD Millipore Corporation (57) ABSTRACT

The disclosure herein relates to a method of reducing background noise during integrity testing of membrane filter to increase sensitivity and more effectively disposition failing membrane filters.

24 Claims, 7 Drawing Sheets

(56) References Cited

U.S. PATENT DOCUMENTS

| | | | |
|---|---|---|---|
| 6,938,460 B2* | 9/2005 | Seiler | B01D 65/104 73/866 |
| 8,388,742 B2* | 3/2013 | Nunes | G01N 15/0826 96/10 |
| 2003/0185436 A1 | 10/2003 | Smith | |
| 2016/0299048 A1 | 10/2016 | Giglia et al. | |
| 2017/0043290 A1 | 2/2017 | Segard | |
| 2017/0252703 A1 | 9/2017 | Adhikari et al. | |
| 2020/0364905 A1 | 11/2020 | Shimodaira et al. | |

FOREIGN PATENT DOCUMENTS

| | | |
|---|---|---|
| EP | 0582822 A1 | 2/1994 |
| EP | 0592066 A1 | 4/1994 |
| EP | 1508362 A1 | 2/2005 |
| JP | H0-377630 A | 4/1991 |
| JP | H0-6154567 A | 6/1994 |
| JP | 2003-296734 A | 10/2003 |
| JP | 2018-501107 A | 1/2018 |
| JP | 2019-200089 A | 11/2019 |
| JP | 2020-187656 A | 11/2020 |
| WO | 95/32412 A1 | 11/1995 |
| WO | 2016/109084 A1 | 7/2016 |
| WO | 2022/146704 A1 | 7/2022 |

OTHER PUBLICATIONS

Giglia et al., "High Sensitivity Binary Gas Integrity Test for Membrane Filters", Journal of Membrane Science, vol. 323, No. 1, Jun. 17, 2008, pp. 60-66.
Jornitz, M. W. et al., "Filter Integrity Testing in Liquid Applications, Revisited", Pharmaceutical technology, vol. 25, No. 10, Nov. 2001, pp. 24-35.
Jornitz, M. W. et al., "Integrity Testing", Filtration in the Biopharmaceutical Industry, 1998, pp. 307-371.
International Preliminary Report on Patentability received for PCT Application No. PCT/US2021/063763 mailing date Jul. 13, 2023, 9 Pages.
International Search Report and Written Opinion received for PCT Application No. PCT/US2021/063763, mailing date Mar. 3, 2022, 12 Pages.
Communication Pursuant to Article 94(3) EPC received for European Patent Application No. 21848353.5 mailing date Jul. 12, 2024, 4 Pages.

* cited by examiner

SECONDARY STATISTICAL CUTOFF METHODOLOGY FOR GAS-LIQUID DIFFUSION INTEGRITY TESTING

RELATED APPLICATIONS

The present application is a U.S. National Stage application of International Application No. PCT/US2021/063763, filed Dec. 16, 2021, which claims the benefit of U.S. Provisional Application No. 63/131,850, filed on Dec. 30, 2020, the entire contents of each of which is incorporated by reference herein in its entirety.

RELEVANT FIELD

Embodiments described herein relate to a method of gas-liquid integrity testing for membrane filters. More specifically, some embodiments of the technology relate to a methodology for gas-liquid diffusion integrity test data analysis that uses normalization of population sub-sets or that adjusts the integrity test data for operating conditions, such as temperature and pressure for the purpose of reducing background noise, thereby improving the defect detection signal to noise ratio.

BACKGROUND

High purity filtration of aqueous media used in the fields of biotechnology, chemistry, electronics, pharmaceuticals, and the food and beverage industries are obtained the use of sophisticated membrane filter modules capable of a high degree of separation. These membrane filters also prevent contamination of the environment, the medium to be filtered, and the resulting filtrate to prevent unwanted, often dangerous organisms, such as bacteria or viruses, as well as environmental contaminants, such as dust, dirt, and the like from entering into the process stream and end product.

To ensure that the sterility and/or retention capability of the membrane filter is not compromised, integrity testing is a requirement during critical process filtration applications. Manufacturers of membrane filters for critical applications also routinely apply integrity tests to finished filter elements as lot release or 100% test criteria. Integrity testing detects the presence of oversized pores or defects that can compromise the retention capability of porous materials. Methods of integrity testing include the particle challenge test, the liquid-liquid porometry test, the bubble point test, the gas-liquid diffusion test, and diffusion tests measuring tracer components. Some of these tests, such as the particle challenge test, are destructive. Therefore, these tests cannot be used as a pre-use test. Liquid-liquid porometry and bubble point tests are useful for ensuring that a membrane with the proper nominal pore size is installed, but the methods lack sensitivity for identifying small numbers of small defects.

Gas-liquid diffusion tests are widely used for assessing filter integrity. A common gas-liquid pair for integrity testing is air-water, owing to the safety, low cost, and environmentally friendly properties of the pair. The diffusion test measures the rate of gas transfer through a filter. At differential gas pressures below the bubble point, gas molecules migrate through water-filled pores of a wetted membrane in accordance with Fick's Law of Diffusion, as follows:

$$Q = \frac{A\varepsilon DS(P_f - P_p)}{\tau L}$$

Where Q is the permeation flow rate, A is the membrane area, $\varepsilon$ is the membrane porosity, D is the diffusivity of the gas in the liquid, S is the solubility coefficient of the gas, $P_f$ and $P_p$ are the feed and permeate side pressures, $\tau$ is the pore tortuosity, and L the thickness of liquid in the membrane.

A measured gas flow rate in excess of that predicted by Fick's Law or higher than a flow rate empirically established for an integral membrane is a signal for a defect. The sensitivity of this test is limited by the minimum detectable excess flow. Significant filter-to-filter variability in gas diffusion flow rates of integral membrane filter devices is possible due to differences in membrane area, membrane thickness, membrane porosity, and pore tortuosity.

Variability in test system hardware and instrumentation and in operating conditions that impact the diffusivity and solubility of the gas in the liquid, such as pressure and temperature, also contribute to the background noise. Background noise can compete or interfere with the defect signal, which is the excess gas flow rate due to convective flow through the defect(s). When faced with increasing noise variation, traditional air diffusion integrity tests would have to expand the acceptable specification window (i.e., decrease defect detection capability) or accept more false failures.

Major contributing factors to this noise variability are membrane properties that vary by lot (herein referred to as "cast date") and test position (herein referred to as "bowl") on the equipment performing the integrity testing cycle. The sensitivity of the gas-liquid diffusion tests for detecting defects is also directly limited by the background noise. High background noise can also cause integral filters to falsely fail the test, which results in added cost waste. A tradeoff decision is required between test sensitivity (product and end-user risk mitigation) and ability to robustly supply the product (yield, cost, and security of supply to the marketplace), when establishing the test acceptance criteria, including upper and lower diffusion specification limits.

Therefore, a need exists for an integrity test methodology that preserves the convenience of the gas-liquid integrity test while minimizing the impact of the inherent background noise variables that can both diminish the capability of the test to detect defects and increase the likelihood of falsely failing integral filters.

SUMMARY

The shortcomings of the prior art are overcome by embodiments described herein, which include some embodiments method of reducing background noise and improving the signal to noise ratio in integrity testing to disposition a membrane filter comprising: performing a gas-liquid diffusion analysis on the membrane filter; identifying whether the membrane filter is an outlier compared to an initial fixed cutoff during the gas-liquid diffusion analysis; normalizing the value at least one property of the at least one membrane filter that impact the background noise in the gas-liquid diffusion analysis, if the membrane filter is not the outlier to the initial fixed cutoff; identifying whether the membrane filter is an outlier compared to a secondary statistical cutoff based on the values from gas-liquid diffusion analyses of a plurality of membrane filters; and dispositioning the membrane filter as integral or failing.

In some embodiments, the gas-liquid diffusion method is air-water. In some embodiments, the at least one property is chosen from the group consisting of lot, equipment test position, water temperature, air temperature, and pressure. In some embodiments, the values of at least two properties are normalized. Some embodiments of the method further comprise normalizing the pressure of the more than one membrane filter. Some embodiments of the method further comprise detecting at least one defect in the more than one membrane filter. In some embodiments, the at least one defect is selected from the range consisting of between about 4 µm and about 9 µm. In some embodiments, the defect is greater than 4 µm. In some embodiments, the defect is selected from the group consisting of about 4 µm, about 5 µm, about 6 µm, about 7 µm, about 8 µm, and about 9 µm. In some embodiments the initial upper cutoff maintains at least a 5% safety factor from end-user diffusion specification criteria. In some embodiments, the initial upper cutoff maintains at least a 5% safety factor from Quality Control (QC) lot release diffusion criteria.

In some embodiments, the initial upper cutoff maintains a safety factor selected from the range consisting of between about 5% to about 15% from the end-user diffusion specification criteria or the Quality Control (QC) lot release diffusion criteria. In some embodiments, the initial upper cutoff maintains a safety factor selected from the group consisting of about 5%, about 6%, about 7%, about 8%, about 9%, about 10%, about 11%, about 12%, about 13%, about 14%, and about 15%. In some embodiments the membrane filter is an outlier to the initial cutoff and is dispositioned as failing. In some embodiments, the membrane filter is an outlier to the secondary cutoff and is dispositioned as failing. In some embodiments, the membrane filter is not an outlier to the initial cutoff or the secondary cutoff and is dispositioned as integral.

In some embodiments, the plurality is a statistically significant number of membrane filters. In some embodiments, the membrane filter and the plurality of membrane filters are the same type of filtration device. In some embodiments, the filtration device is selected from the group consisting of: sterilizing grade filters, virus filters, clarification filters, and ultrafiltration filters. In some embodiments, the secondary statistical cutoff is established by setting the upper statistical limit to between 2 and 5 standard deviations above the normalized median of the values. In some embodiments, the secondary statistical cutoff is established by setting the upper statistical limit to about 2, about 3, about 4, and about 5 standard deviations above the normalized median of the values. In some embodiments, the secondary statistical cutoff is established by setting the lower statistical limit to between 4 and 6 standard deviations below the normalized median of the values. In some embodiments the secondary statistical cutoff is established by setting the upper statistical limit to about 2, about 3, about 4, and about 5 standard deviations above the normalized median of the values.

BRIEF DESCRIPTION OF THE DRAWINGS

FIG. 2A and FIG. 2B provide boxplots with the data sets generated by a traditional air diffusion integrity test.

The appended drawings illustrate some embodiments of the disclosure herein and are therefore not to be considered limiting in scope, for the invention may admit to other equally effective embodiments. It is to be understood that elements and features of any embodiment may be found in other embodiments without further recitation and that, where possible, identical reference numerals have been used to indicate comparable elements that are common to the figures.

DETAILED DESCRIPTION

The disclosure herein describes some embodiments of a method of integrity testing.

Some embodiments of the method of integrity testing described herein use normalization of air diffusion data by bowl and by cast date to increase signal to noise ratio and increase defect detection capability. Further, the method better absorbs membrane and equipment variation than traditional integrity tests to provide a more stringent and consistent disposition of product without sacrificing yields or decreasing sensitivity.

Some embodiments of the method of integrity testing described herein normalizes air diffusion data by equipment test position (bowl) and by cast date (material and upstream process variation). The resulting variation can be accounted for by using normalization by understanding the variation these sub-populations add to the process in a predictable way. The normalized data set of the method of integrity testing described herein has a significantly lower background noise level without affecting the defect signal, which results in an increased signal to noise ratio and greater capability of finding outliers (defects) amongst the normal population.

Some embodiments of the method described herein is capable of detecting defects as small as 5 microns (µm) for a 10-inch filtration device, compared with 10-15 µm in traditional air diffusion test.

Some embodiments of the method of integrity testing described herein comprise the following procedure for setting upper and lower cutoffs for a normalized data set. Some embodiments of the method include a two-cutoff system comprising an initial fixed cutoff that identifies gross failures at the time of testing and a secondary statistical cutoff that is applied to the normalized data set at the close of the lot.

Some embodiments of the method of integrity testing include the following steps to set initial fixed upper and lower spec limit:
  obtaining historical air diffusion data from a large selection of cast dates and determine the extent of diffusion variation;
  determining a pressure adjusted value that can be directly compared to the end-user pre and post use integrity specification and the QC lot release diffusion criteria;
  determining an upper cutoff that has minimal impact to yield and also
  determining an upper cutoff that has minimal impact to yield, yet also maintains at least a 15 percent safety factor from the end-user diffusion specification and QC lot release diffusion criteria;
  determining a lower cutoff that has minimal impact to yield, yet also provides an adequate boundary that will trigger process reassessment if exceeded.

I. Setting Cutoffs

In some embodiments, the initial cutoff is placed far enough from current air diffusion values that large amounts of cast date variation can be tolerated without impacting yields. In some embodiments, the initial cutoff maintains a safety factor from the end-user pre- and post-use integrity test as well as the quality control (QC) lot release testing specification. In some embodiments, the QC lot release testing specification is adjusted for pressure. Some embodiments of the integrity test are more sensitive than both the end user specification and the QC lot release testing specifications.

In some embodiments, diffusion specifications are set with a reference test pressure (i.e., less than 30.0 sccm at 40 psi). In some embodiments, if the integrity test pressure was not equivalent to the existing reference pressure for the end user specification or QC specification, then a correction factor is determined to compare the values from different test pressures.

In some embodiments, the secondary cutoff is applied to the lot data that has been normalized by bowl and/or by cast date to greatly reduce two of the largest sources of variation from the data and allows easier placement of the cutoff for optimal separation of the outliers from the normal population.

Some embodiments of the method of integrity testing include the following steps to set secondary statistical upper and lower spec limit:
- selecting an integrity test data set representing a statistically significant number of membrane filter devices, cast dates, and any other test or filter production variables that can impact the air diffusion test background noise;
- testing filters using air diffusion and removing any that grossly fail;
- running a Ryan-joiner (RJ) normality test;
- removing outliers until the RJ score is at an acceptable value;
- performing normalization of air diffusion data according to the methodology described herein;
- calculating a suggested upper specification limit at 3-4 standard deviations above the normalized median, and calculating a suggested lower specification limit at 4-6 standard deviations below the normalized median;
- evaluating bacterial retention performance of units below, at, and above the upper cutoff as available;
- considering defect mode, defect size, and log reduction value (LRV) of retention failures at or below the cutoff, as well as sample size;
- reviewing retention data and determining the final upper cutoff;
- evaluating proximity of diffusion test results to the lower cutoff; and
- reviewing results and determining the final lower specification limit.

In some embodiments, the method of integrity testing described herein enables the identification of incorrect raw materials used during the manufacturing process, which the existing technology cannot identify during in-process testing. Some embodiments of the method of integrity testing has identified improperly processed materials (e.g. incorrectly oriented membranes), which the existing technology cannot identify during in-process testing.

Some embodiments of the normalization method adjust for test position (bowl) and lot (cast date) variation. Some embodiments include additional sources of variation, such as water and air temperature, second membrane layer cast date, support material roll, and actual achieved prestress or test pressure. Tradeoffs to statistical confidence must be acknowledged when assessing inclusion of additional factors due to diminishing sample size of subgroups.

Some embodiments of the method of integrity testing can be used for any filtration device that employs a gas-liquid diffusion test, including but not limited to sterilizing grade filters, virus filters, clarification filters, and ultrafiltration filters. Some embodiments of the method of integrity testing described herein maintains adequate yield and improves defect detection.

II. Equipment

Some embodiments of the method of integrity testing are performed on a control system built to operate 24 hours per day and 365 days per year. In some embodiments, a combination of equipment and software infrastructure enable the automated collection of both construction and integrity test material and process data. In some embodiments, processing and material information is collected simultaneously by the data acquisition system.

In some embodiments, integrity testing of the membrane filter is executed in single-piece-flow fashion. Alternatively, batching of testing may occur.

In some embodiments of the method of integrity testing, an automated system uses the initial (gross) diffusion specification limits to disposition a failing product in real-time. In some embodiments, a lot typically comprises between about 1000 and about 1800 10-inch membrane filters.

Some embodiments of the method of integrity testing include the step of flagging any test bowl with abnormal results for review of potential impacts from factors beyond expected median and/or standard deviation results compared with recipe settings or the grand lot populations. Some embodiments of the method of integrity testing include the step of flagging any membrane roll (cast date) with abnormal results for review for potential impacts from factors beyond expected median and/or standard deviation results compared with recipe settings or the grand lot populations.

III. Definitions

Unless defined otherwise, all technical and scientific terms used herein have the same meaning as commonly understood by one of ordinary skill in the art to which this invention pertains.

As used herein, the singular forms "a", "an," and "the" include plural unless the context clearly dictates otherwise.

As used herein, "CF1" refers to the correction factor for normalization of a dataset based on a first property. In some embodiments, the CF1 is the correction factor for the normalized dataset by bowl around a median value of 0.

As used herein, "CF1MF" refers to the correction factor for normalization of mass flow.

As used herein, "CF2" refers to the correction factor for normalization of a dataset based on a second property. In some embodiments, the CF2 is the correction factor for the normalized dataset by master roll (cast date) around a median value of 0.

As used herein, "CF2MF" refers to the correction factor for normalization of mass flow.

As used herein, the "initial fixed cutoff" refers to failures at the time of testing, which is similar to the traditional integrity test cutoff. Initial fixed cutoff is the Upper Specification Limit (USL) and Lower Specification Limit (LSL) applied at time of testing to identify moderate to gross rejects. Units that fail the initial cutoff are rejected and removed from the lot during the testing process.

As used herein, "integral" refers to a non-defective membrane filter.

As used herein, "failing" refers to defective membrane filters. In some embodiments, failing membrane filters are alternatively referred to as "non-integral".

As used herein, the "secondary statistical cutoff" refers to using normalized test data applied at the close of the lot to identify additional failures, which are outliers to the normal population. Secondary statistical cutoff is the fixed USL and LSL applied at the close of the lot to the dataset after it has been normalized by bowl and master roll. Units that fail the secondary statistical cutoff are rejected and removed from the lot during the accountability step. The secondary statistical cutoff is established by setting the USL to be within the range of 2 to 4 standard deviations above the normalized median. In some embodiments, the USL is at least or equal to 2 standard deviations above the normalized median. In some embodiments, the USL is about 2 standard deviations above the normalized median. In some embodiments, the USL is at least or equal to 3 standard deviations above the normalized median. In some embodiments, the USL is about 3 standard deviations above the normalized median. In some embodiments, the USL is at least or equal to 4 standard deviations above the normalized median. In some embodiments, the USL is about 4 standard deviations above the normalized median.

In some embodiments, the secondary statistical cutoff is established by setting the LSL to be within the range of 4 to 6 standard deviations below the normalized median. In some embodiments, the LSL is at least or equal to 4 standard deviations below the normalized median. In some embodiments, the LSL is about 4 standard deviations below the normalized median. In some embodiments, the LSL is at least or equal to 5 standard deviations below the normalized median. In some embodiments, the LSL is about 5 standard deviations below the normalized median. In some embodiments, the LSL is at least or equal to 6 standard deviations below the normalized median. In some embodiments, the LSL is about 6 standard deviations below the normalized median. Standard deviation calculations may be from the property of the membrane filter used in development, such as cast date variation lots or bowl.

As used herein, "MRMinQty" refers to the minimum sample size per master roll required for standard processing. If minimum quantity is not met, then alternate processing rules apply. This is a recipe defined parameter.

As used herein, "BowlMinQty" refers to the minimum sample size per bowl per lot required for standard processing. If minimum quantity is not met alternate processing rules apply. This is a recipe defined parameter.

As used herein, "MaxBowlVar" refers to the limit for allowable variation between a bowl median and the average lot bowl median for standard processing. This is a recipe defined parameter.

As used herein, "MaxMRVar" refers to the limit for allowable variation between a master roll and the average lot master roll median for standard processing. This is a recipe defined parameter.

As used herein, "MaxMRStDev" refers to the limit for allowable standard deviation of normalized data for each master roll for standard processing. Sample standard deviation is used in this calculation. This is a recipe defined parameter.

EXAMPLES

Example 1. Experimental Procedures

The initial fixed cutoff and secondary statistical cutoff disposition procedure for air diffusion data on inline integrity testing in the additional Examples was performed as follows. The calculations may be performed manually and or using a database.

Variables of Mass flow, USL, LSL, and CF2MF were rounded to the tenths decimal place. Variables of CF1, CF1MF, CF2, and any Standard Deviation (StdDev) were rounded to the hundredths decimal place. Normalizing was used to align the median values of subpopulations of the dataset. This process normalized the dataset by bowl around a median value of 0. Then, the modified dataset was normalized by master roll (cast date) around a median value of 0.

The air diffusion data was collected at the close of the lot. The data from membrane filters that did not pass the first cutoff were removed, including aerosol failures, wet rejects, and wet retests. One data set was used per membrane filter. If a membrane filter had more than one air diffusion test value, the final diffusion test value was used. A sample size, N, and median mass flow value (BOWL_MEDIAN) was calculated for each bowl from the remaining data set. Then, a correction factor for normalization, CF1, was calculated for each bowl, B:

$CF1_B = 0 - BOWL\_MEDIAN_B$

Example: $CF1_{343} = 0 - BOWL\_MEDIAN_{343}$

The preceding steps were completed for all bowls.

If the N for any bowl (B) was less than the BowlMinQty, the following formulas were used instead to calculate the CF1 for the low sample size bowl(s). $BOWL\_MEDIAN_{AVG}$ is the average bowl median value of all bowls with sample sizes above BowlMinQty.

$CF1_B = 0 - BOWL\_MEDIAN_{AVG}$

Example: Bowl 346 had N=20. This was less than BowlMinQty of 24.

$CF1_{346} = 0 - BOWL\_MEDIAN_{AVG}$

Example: Four bowls were used for testing, and the MaxBowlVar=0.9 sccm (standard cubic centimeters).

$BOWL\_MEDIAN_{343} = 12.8$ sccm
$BOWL\_MEDIAN_{344} = 14.4$ sccm
$BOWL\_MEDIAN_{345} = 13.8$ sccm
$BOWL\_MEDIAN_{346} = 14.2$ sccm Calculated $BOWL\_MEDIAN_{AVG} = (12.8+14.4+13.8+14.2)/4 = 13.8$ For each membrane filter, x, in the data set, with a mass flow value ($MF_x$) that was tested on bowl (B), a correction factor for normalization of mass flow (CF1MF) value was calculated using the formula below:

$CF1MF_x = MF_x + CF1_B$

Example: Serial 1001 was tested on bowl 345 and has a recorded mass flow value of 14.3 sccm. $CF1_{345}$ was calculated to be −13.8 sccm.

$CF1MF_{1001} = 14.3 + (-13.8 \text{ sccm}) = 0.5$ sccm

The CF1MF data set was reviewed, and the sample size, N, and median CF1MF value were calculated for each master roll (MR_MEDIAN) used in the lot. Then, a correction factor for normalization, CF2, was calculated for each master roll (R) using the following: $CF2_R = 0 - MR\_MEDIAN_R$.

Example:
$CF2_{3135UE} = 0 - MR\_MEDIAN_{3135UE}$
$CF2_{3004UD} = 0 - MR\_MEDIAN_{3004UD}$ The preceding steps were completed for all master rolls.

Limit verification was performed for master roll sample size and master roll median values. If the N for any master roll (R) was less than the MRMinQty, then the following formula was used instead to calculate the CF2 for the low sample size master roll(s): $CF2_R=0-MR\_MEDIAN_{AVG}$. $MR\_MEDIAN_{AVG}$ is the average master roll median value of remaining master rolls with sample sizes above MRMinQty.

Example: Master roll 3162UE had N=15. This is less than MRMinQty of 24.

$CF2_{3162UE}=0-MR\_MEDIAN_{AVG}$

Example: Four master rolls were used in a lot, and the MaxMRVar=1.5 sccm.

Data is below:
$MR\_MEDIAN_{5240UE}=0.0$ sccm
$MR\_MEDIAN_{5241UE}=-1.0$ sccm
$MR\_MEDIAN_{5242UE}=1.7$ sccm
$MR\_MEDIAN_{5243UE}=-0.7$ sccm Calculated $MR\_MEDIAN_{AVG}=(0.0+-1.0+1.7+-0.7)/4=0.0$ For each group of membrane filters (x) in the data set, with a CF1MF value ($CF1MF_x$) with membrane from master roll (R), calculate a CF2MF value using the formula below:

$CF2MF_x=CF1MF_x+CF2_R$

Example: Group 2001 contained membrane from master roll 3452UE and had a calculated CF1MF value of 1.1 sccm. CF23452UE was calculated to be −0.8 sccm.

$CF2MF_{2001}=1.1+(-0.8 \text{ sccm})=0.3$ sccm

Limit verification was performed for master roll standard deviation of normalized mass flow values. Outliers were removed from the CF2MF data set, and then the standard deviation of CF2MF is calculated for each master roll. CF2MF values for each unit were compared to secondary statistical cutoff USL and LSL. Any unit that is above the USL or below the LSL is dispositioned as a failing unit. The failures from the secondary statistical cutoff were rejected from the production lot.

Example 2. Comparing Standard Data to Normalized Data

Figure 1A:
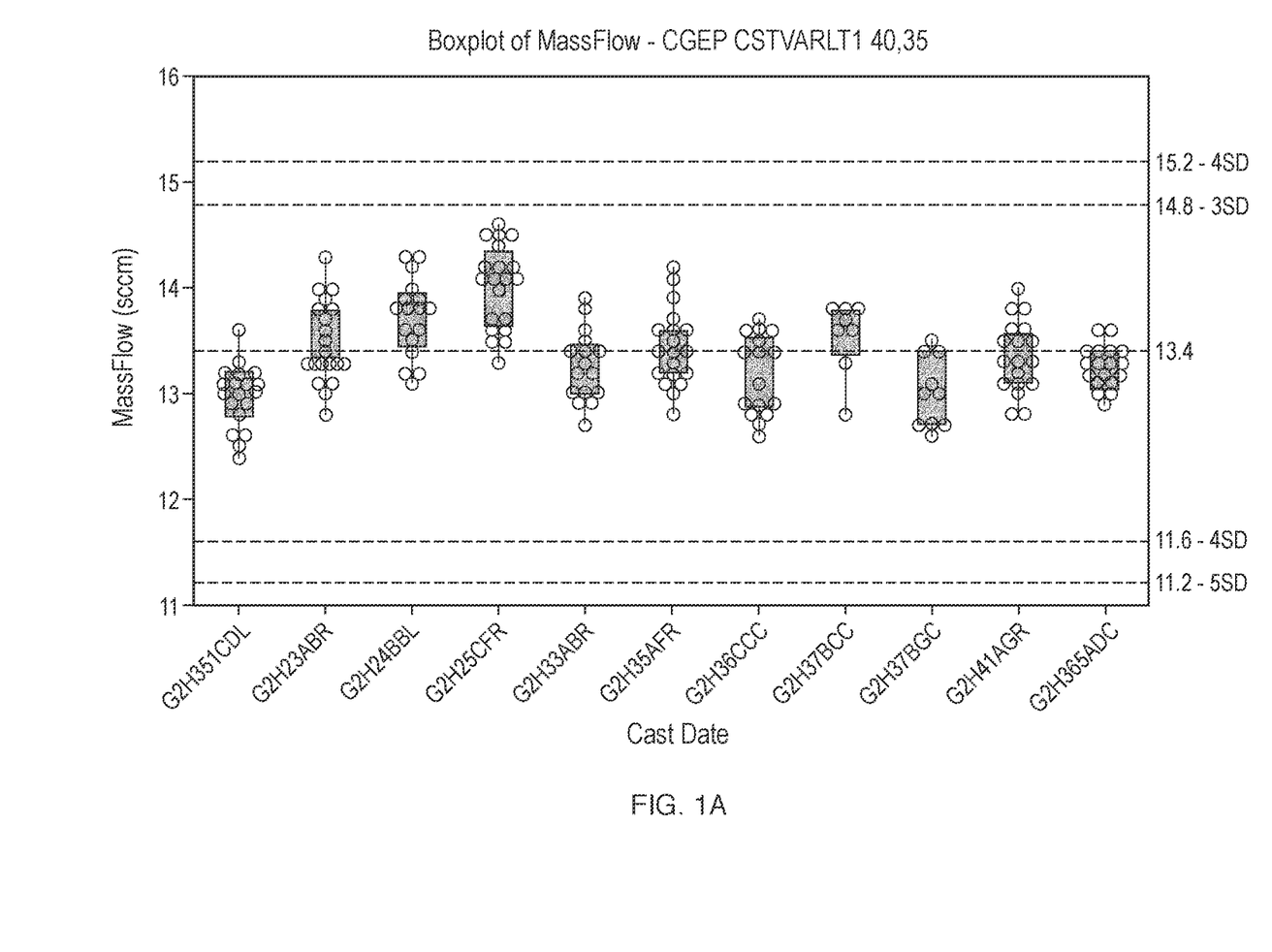
FIG. 1A and FIG. 1B provide boxplots comparing air diffusion data from a traditional integrity test to air diffusion data from an embodiment of the method of integrity testing with a secondary cutoff described herein.

FIG. 1A (CGEP=10-inch SHF filter, CSTVARLT1=Lot name) is a boxplot of air diffusion values from a lot that consisted of integral filters (0.2 μm PES (polyethersulfone) sterilizing grade 10-inch cartridge membrane filters; diffusion specification: less than 30.0 sccm at 40 psi) from 11 cast dates. Standard diffusion data showed a population with a median of 13.4 sccm and a standard deviation of 0.45 sccm. Potential test specification limits, which typically exist in the 3-4 standard deviation range, were placed at 14.8-15.2 sccm. An upper cutoff had been established at 15.0 sccm, which is located 1.6 sccm (3.5 standard deviations) from the population median. Devices with a nominal defect signal of 1.7 sccm or greater were dispositioned as failures. At a test pressure of 35 psi, this excess flow rate corresponded to a single cylindrical defect size between 7-8 μm as calculated for an orifice type defect and was confirmed experimentally.

Figure 1B:
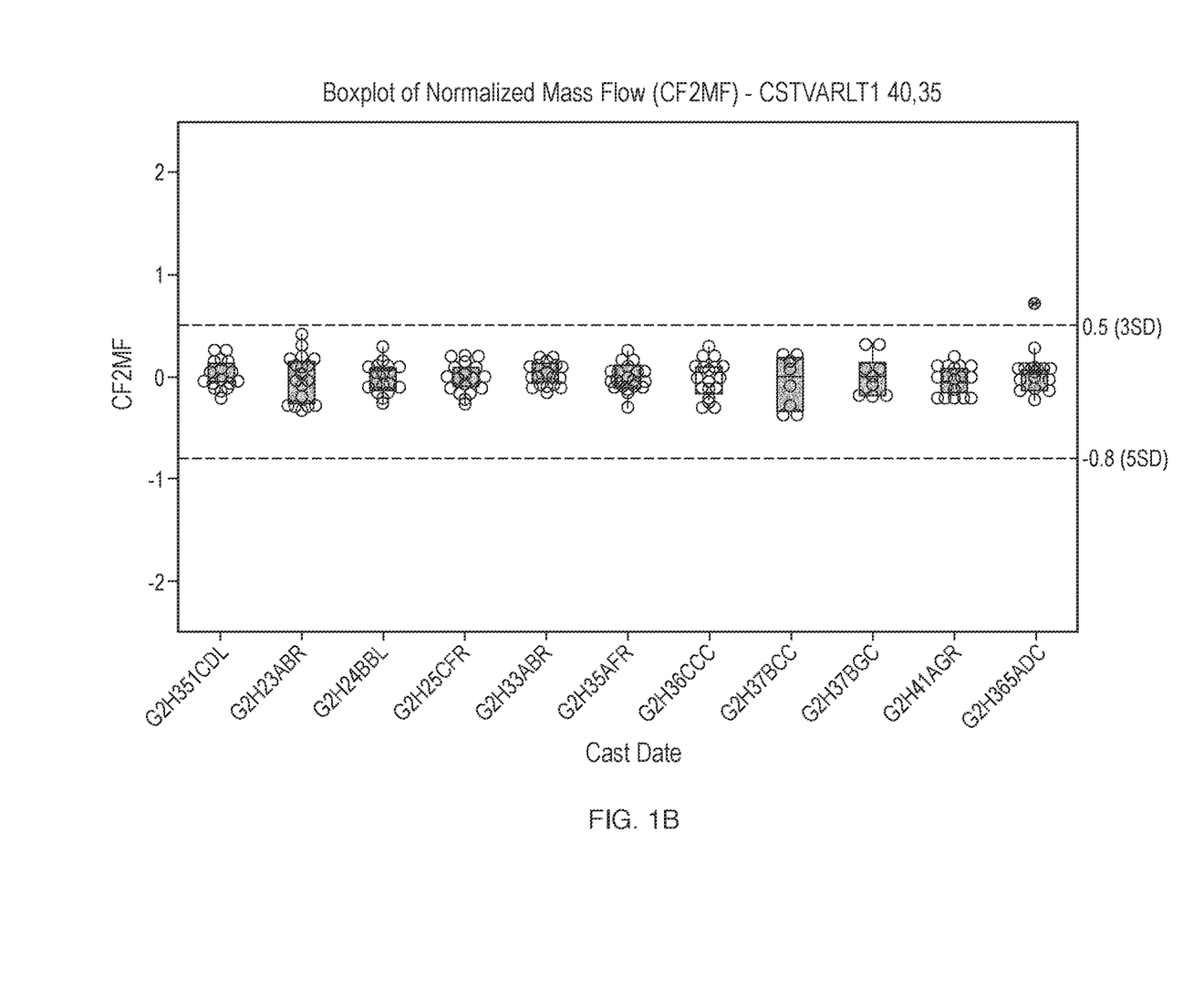

FIG. 1B (CF2MF=normalized mass flow) is a boxplot of the same data from the same membrane filters, normalized by test bowl and membrane cast date using the method of integrity testing herein. The data was normalized to have a median value of 0, and the standard deviation of the population was 0.16 sccm. In the normalized data set, the upper cutoff at 3 standard deviations was located 0.5 sccm from the population median. Devices with a nominal defect signal of 0.6 sccm or greater were dispositioned as failures. At a test pressure of 35 psi, this excess flow rate corresponded to a defect size between 4-5 urn.

The normalization of the data set was observed to significantly reduce the overall variability of the integral filter diffusion population. Therefore, the method of integrity testing herein provides a higher degree of sensitivity and applies a consistent cutoff to each device because its final disposition is determined relative to the sub-population median rather than the absolute diffusion value.

Example 3. Dispositioning Sterilizing Grade Filters

Figure 2A:
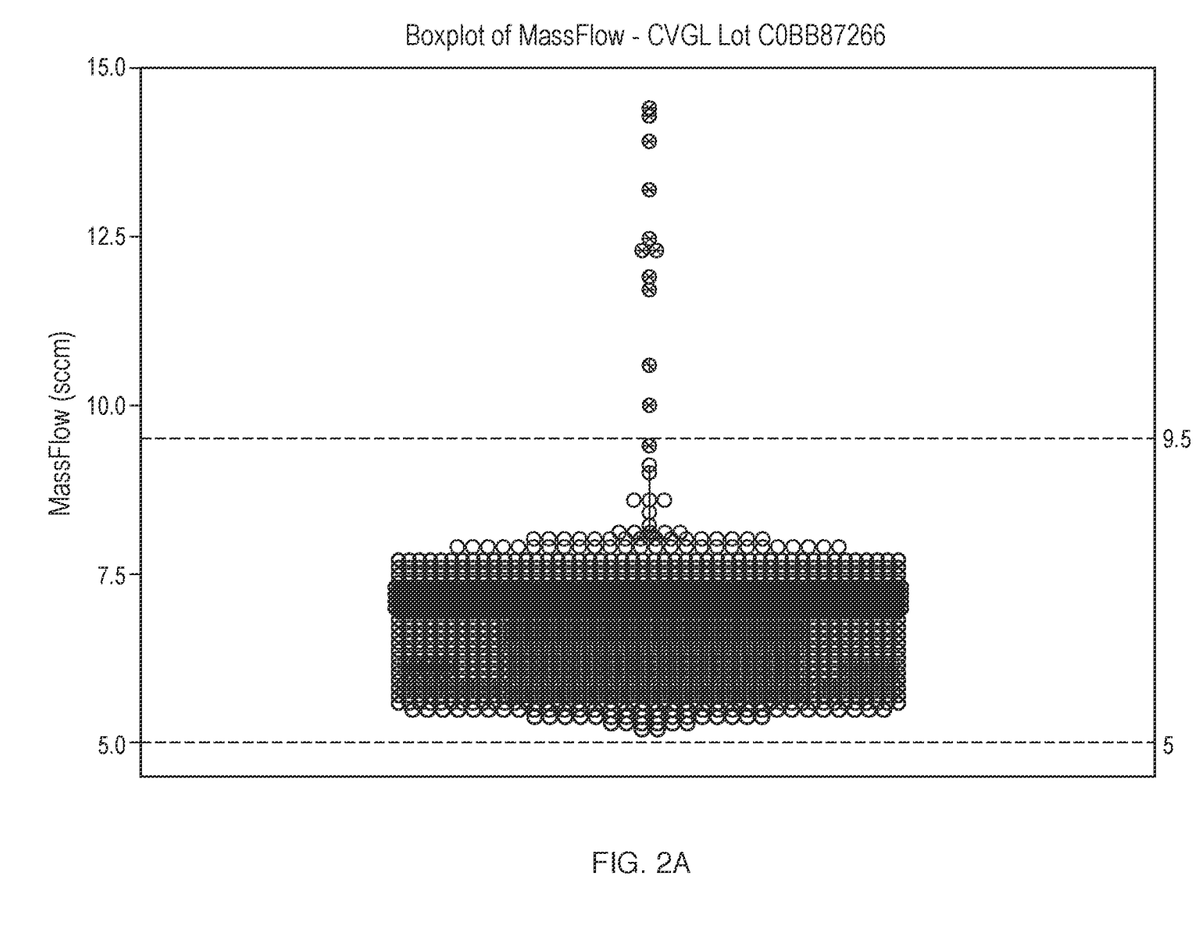
FIG. 2A shows the complete data set.
Figure 2B:
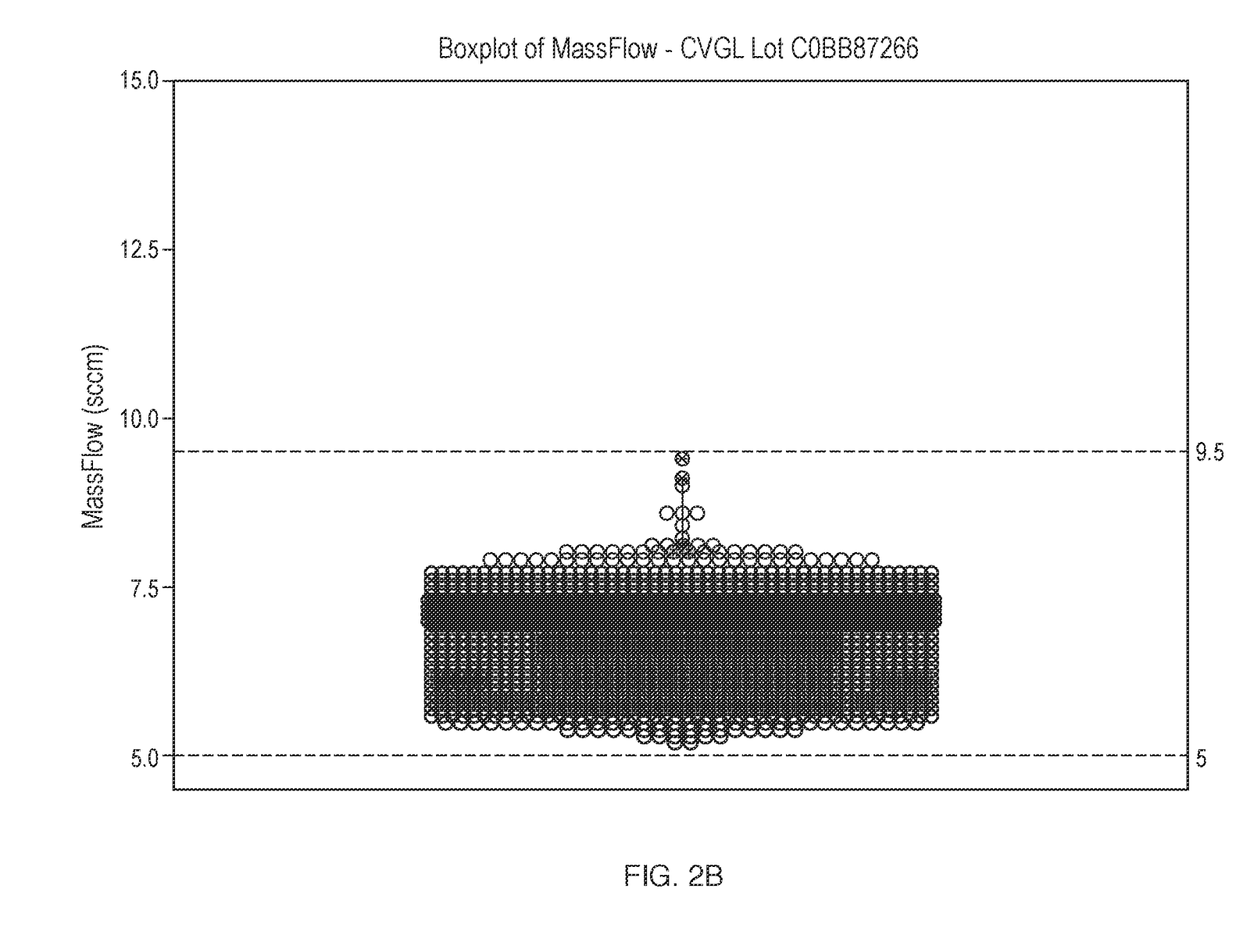
FIG. 2B shows the data set with the outliers removed.

An air diffusion integrity test with secondary cutoffs was observed to be capable of properly dispositioning sterilizing grade filters as failures, which fail bacterial retention testing and could pass the traditional air diffusion integrity test. The lot shown in FIG. 2A has air diffusion data plotted with traditional upper and lower cutoffs for this product, which are 9.5 sccm and 5 sccm, respectively. The integral filters were observed as a normally distributed population located between the upper and lower cutoffs, and filters with elevated diffusion (i.e., outliers to the normal population) are dispositioned as failing units. FIG. 2B shows the passing filters from this lot, with all failing units removed.

Figure 3A:
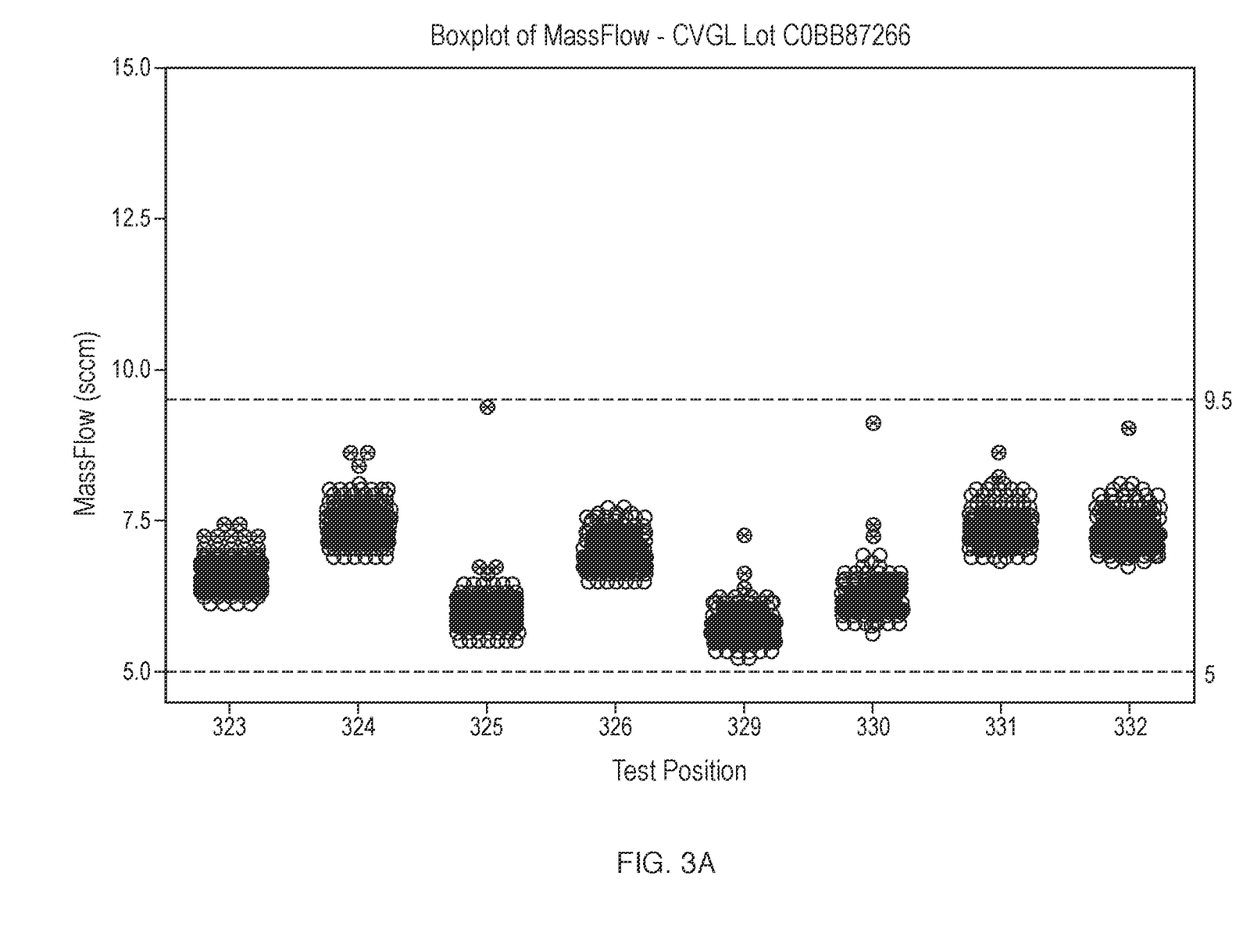
FIG. 3A and FIG. 3B provide boxplots comparing the data set of the preceding FIG. 1 and FIG. 2 by sub-populations of test bowl (FIG. 3A) and membrane cast date (FIG. 3B).
Figure 3B:
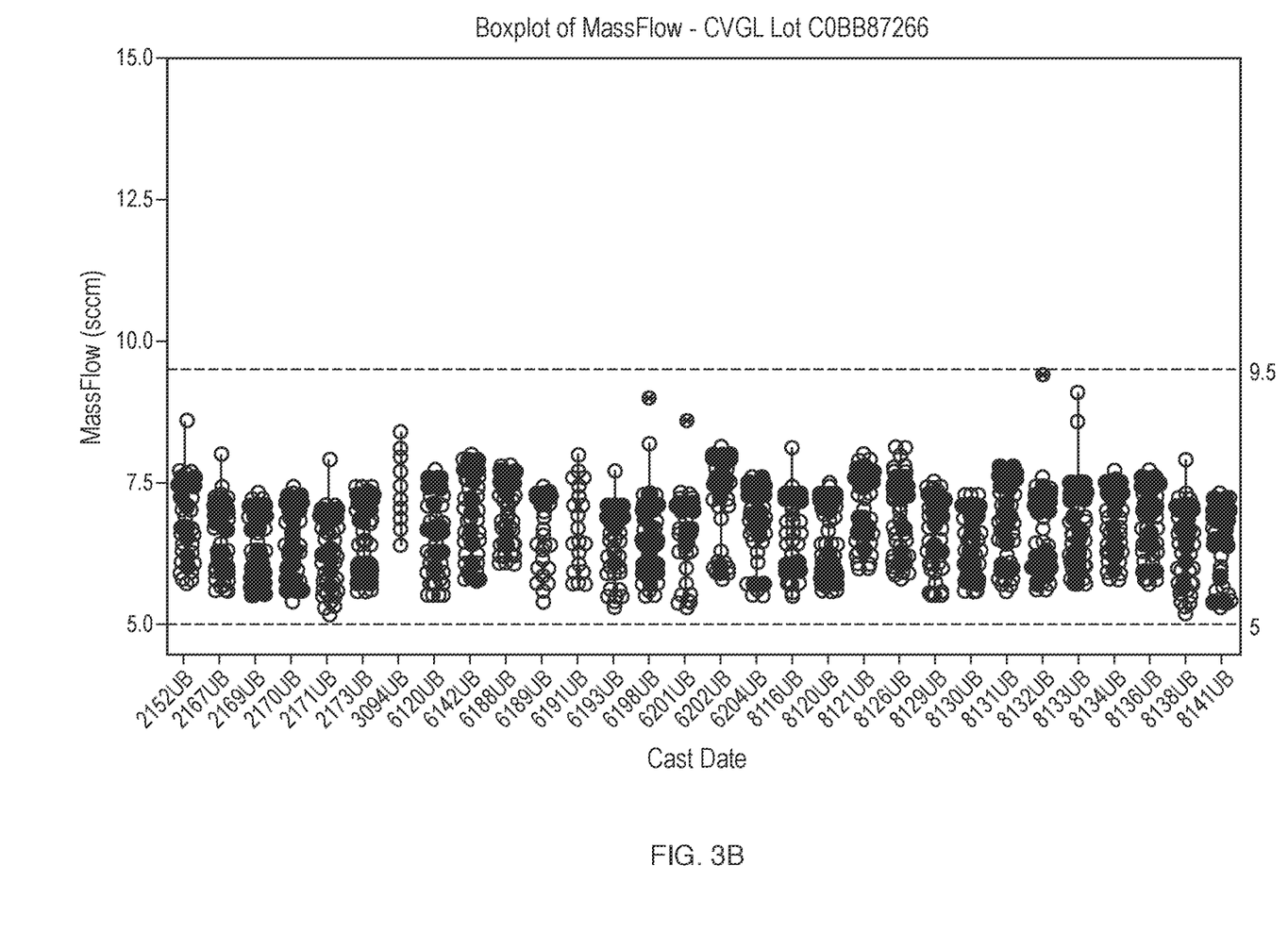

Example 4. Comparing Normalization of Populations of Test Bowl and Membrane Cast Date When viewing the data set of the preceding Examples by sub-populations of test bowl (FIG. 3A) and membrane cast date (FIG. 3B), additional outliers were observed. CVGL Lot C0BB87266 represents 0.2 μm PVDF (Polyvinylidene difluoride) sterilizing grade 10-inch DURAPORE® cartridge membrane filters.

Example 5. Dispositioning Membrane Filters Failing Retention Testing

Figure 4:
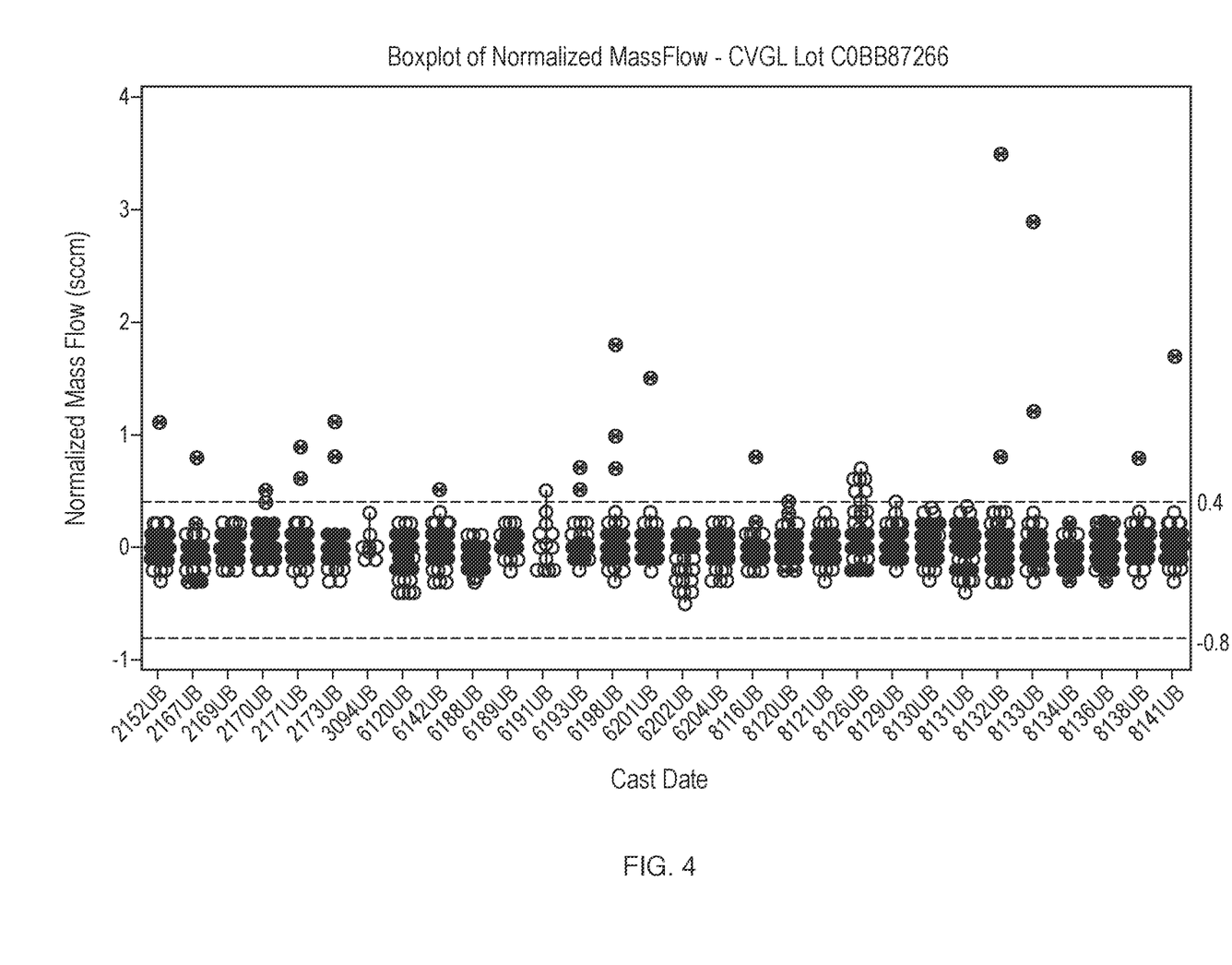
FIG. 4 provides a boxplot the same data set from the preceding Examples normalized for both test position and membrane cast date.

The boxplot in FIG. 4 shows the same data set from the preceding Examples normalized for both test position and membrane cast date. A number of additional outliers to the integral population were observed, all which passed the traditional air diffusion integrity test. One of these additional outliers also failed retention testing, which demonstrates benefits to product quality (product and end-user risk) with the application of this method of integrity testing.

EQUIVALENTS

All ranges for formulations recited herein include ranges therebetween and can be inclusive or exclusive of the endpoints. Optional included ranges are from integer values therebetween (or inclusive of one original endpoint), at the order of magnitude recited or the next smaller order of magnitude. For example, if the lower range value is 0.2, optional included endpoints can be 0.3, 0.4, . . . 1.1, 1.2, and the like, as well as 1, 2, 3 and the like; if the higher range is 8, optional included endpoints can be 7, 6, and the like, as well as 7.9, 7.8, and the like. One-sided boundaries, such as 3 or more, similarly include consistent boundaries (or ranges) starting at integer values at the recited order of magnitude or one lower. For example, 3 or more includes 4, or 3.1 or more.

Reference throughout this specification to "one embodiment," "certain embodiments," "one or more embodiments," "some embodiments," or "an embodiment" indicates that a feature, structure, material, or characteristic described is included some embodiments of the disclosure. Therefore, the appearances of the phrases such as "in one or more embodiments," "in certain embodiments," "in one embodiment," "some embodiments," or "in an embodiment" throughout this specification are not necessarily referring to the same embodiment.

Publications of patent applications and patents and other non-patent references, cited in this specification are herein incorporated by reference in their entirety in the entire portion cited as if each individual publication or reference were specifically and individually indicated to be incorporated by reference herein as being fully set forth. Any patent application to which this application claims priority is also incorporated by reference herein in the manner described above for publications and references.

What is claimed is:

1. A method of reducing background noise and improving the signal to noise ratio in integrity testing to disposition a membrane filter comprising:
performing a gas-liquid diffusion analysis on the membrane filter, the method;
identifying whether the membrane filter is an outlier compared to an initial fixed cutoff during the gas-liquid diffusion analysis;
if the membrane filter is not an outlier compared to the initial fixed cutoff, then normalizing a value of at least one property of the membrane filter that impacts a background noise in the gas-liquid diffusion analysis; and
identifying whether the membrane filter is an outlier compared to a secondary statistical cutoff based on values of at least two properties of a plurality of membrane filters from gas-liquid diffusion analyses of the plurality of membrane filters; and
dispositioning the membrane filter as integral or failing.

2. The method of claim 1, wherein the gas-liquid diffusion analysis comprises air-water.

3. The method of claim 1, wherein the at least one property of the membrane filter is chosen from the group consisting of lot, equipment test position, water temperature, air temperature, and pressure.

4. The method of claim 1, wherein the values of at least two properties of the plurality of membrane filters are normalized.

5. The method of claim 1, further comprising normalizing a pressure of the plurality of membrane filters.

6. The method of claim 1, further comprising detecting a defect in the plurality of membrane filters.

7. The method of claim 1, wherein the membrane filter is a 10-inch sterilizing grade filter.

8. The method of claim 7, wherein the defect is selected from the range consisting of between about 4 µm and about 9 µm.

9. The method of claim 8, wherein the defect is greater than 4 µm.

10. The method of claim 8, wherein the defect is selected from the group consisting of about 4 µm, about 5 µm, about 6 µm, about 7 µm, about 8 µm, and about 9 µm.

11. The method of claim 1, wherein an initial upper cutoff of the fixed cutoff maintains at least a 5% safety factor from end-user diffusion specification criteria.

12. The method of claim 11, wherein an initial upper cutoff of the fixed cutoff maintains a safety factor selected from the group consisting of about 5%, about 6%, about 7%, about 8%, about 9%, about 10%, about 11%, about 12%, about 13%, about 14%, and about 15%.

13. The method of claim 1, wherein an initial upper cutoff of the fixed cutoff maintains at least a 5% safety factor from Quality Control (QC) lot release diffusion criteria.

14. The method of claim 13, wherein an initial upper cutoff of the fixed cutoff maintains a safety factor selected from the range consisting of between about 5% to about 15% from the end-user diffusion specification criteria or the Quality Control (QC) lot release diffusion criteria.

15. The method of claim 1, wherein the membrane filter is an outlier to the initial fixed cutoff and is dispositioned as failing.

16. The method of claim 1, wherein the membrane filter is an outlier to the secondary statistical cutoff and is dispositioned as failing.

17. The method of claim 1, wherein the membrane filter is not an outlier to either the initial cutoff or the secondary statistical cutoff and is dispositioned as integral.

18. The method of claim 1, wherein a number of the plurality of membrane filters is a statistically significant number.

19. The method of claim 1, wherein the membrane filter and the plurality of membrane filters are the same type of filtration device.

20. The method of claim 19, wherein the filtration device is selected from the group consisting of: sterilizing grade filters, virus filters, clarification filters, and ultrafiltration filters.

21. The method of claim 1, wherein the secondary statistical cutoff is established by setting an upper statistical limit to between 2 and 5 standard deviations above a normalized median of the values.

22. The method of claim 1, wherein the secondary statistical cutoff is established by setting an upper statistical limit to about 2, about 3, about 4, or about 5 standard deviations above a normalized median of the values.

23. The method of claim 1, wherein the secondary statistical cutoff is established by setting a lower statistical limit to between 4 and 6 standard deviations below a normalized median of the values.

24. The method of claim 1, wherein the secondary statistical cutoff is established by setting an upper statistical limit to about 2, about 3, about 4, or about 5 standard deviations above a normalized median of the values.

* * * * *